United States Patent Office 2,970,148
Patented Jan. 31, 1961

2,970,148

1-ISONICOTINYL-2-VERATRYLIDENE HYDRAZINE

Herman Herbert Fox, Passaic, N.J., assignor to Hoffmann-La Roche Inc., Nutley, N.J., a corporation of New Jersey No Drawing. Original application Mar. 7, 1952, Ser. No. 275,250. Divided and this application Dec. 6, 1957, Ser. No. 700,987

1 Claim. (Cl. 260—295)

This application relates to novel compounds which are antitubercular agents. The invention embraces the compounds in the form of their free bases as well as acid addition salts thereof.

The compounds are:

1-isonicotinyl-2-(α-methylbenzylidene)hydrazine
1-isonicotinyl-2-(1-phenyloctylidene)hydrazine
1-isonicotinyl-2-cinnamylidenehydrazine
1-isonicotinyl-2-(p-methoxybenzylidene)hydrazine
1-isonicotinyl-2-veratrylidenehydrazine
1-isonicotinyl-2-(α-methylveratrylidene)hydrazine
1-isonicotinyl-2-piperonylidenehydrazine The preparation of the compounds is illustrated by the following examples. Where the compounds are obtained in the form of the free bases, the latter can be readily converted to the acid addition salts on treatment with acids, e.g., hydrochloric acid, hydrobromic acid, nitric acid, sulfuric acid, phosphoric acid, ethane sulfonic acid, tartaric acid, and the like. Where the compounds are isolated in the form of acid addition salts, the latter can be converted to the free bases by treatment with an alkali, for example, sodium hydroxide or ammonium hydroxide. It is to be understood that the claims are to be construed as also embracing salts of the bases.

*Example 1*

A mixture of 27.4 grams of isonicotinylhydrazine (which is also known as isonicotinic acid hydrazide), 30 grams of piperonal, and 200 cc. of water was warmed to about 50° C. and shaken. A solid precipitate was formed, and the mixture was permitted to stand until precipitation was complete. The precipitate was then filtered off and suspended in hot isopropanol. On cooling the suspension, 1-isonicotinyl-2-piperonylidenehydrazine was obtained in the form of colorless prisms or fine needles; M.P. 236–237° C.

*Example 2*

A mixture of 13.7 grams of isonicotinylhydrazine and 15 grams of anisaldehyde was heated on a steam-bath. Partial solution occurred followed by solidification of the reaction mixture to produce 1-isonicotinyl-2-(p-methoxybenzylidene)hydrazine. Upon crystallization from xylene, the compound was obtained in the form of lustrous white flakes; M.P. 171.5–173.5° C.

*Example 3*

A mixture of 17.5 grams of isonicotinylhydrazine, 26 grams of phenyl n-heptylketone, and 100 cc. of methanol was refluxed for about 2 hours. The reaction mixture was then concentrated to about one-half volume and cooled. 1-isonicotinyl-2-(1-phenyloctylidene)hydrazine precipitated and was filtered off. Upon recrystallization from isopropanol-ligroin, the compound was obtained in the form of lustrous white needles which melted at 125.5–126.5° C.

*Example 4*

A mixture of 40 grams of isonicotinylhydrazine, 40 cc. of acetophenone, and 200 cc. of methanol was refluxed for 2 hours. On cooling the reaction mixture, 1-isonicotinyl-2-(α-methylbenzylidene)hydrazine precipitated. It was recovered by filtration and crystallized from methanol: M.P. 173–173.5° C.

*Example 5*

A mixture of 28 grams of isonicotinylhydrazine, 37 grams of 3,4-dimethoxy-acetophenone, and 100 cc. of isopropanol was heated on a steam-bath to solution. On cooling the reaction mixture, 1-isonicotinyl-2-(α-methylveratrylidene)hydrazine precipitated. It was recovered by filtration and crystallized from isopropanol; M.P. 189.5–190.5° C.

*Example 6*

A mixture of 27.4 grams of isonicotinylhydrazine, 26.4 grams of cinnamaldehyde, and 500 cc. of isopropanol was heated on a steam-bath to solution. On cooling the reaction mixture, 1-isonicotinyl-2-cinnamylidenehydrazine precipitated as small yellow crystals; M.P. 201–202° C.

*Example 7*

A mixture of 42 grams of isonicotinylhydrazine, 51 grams of veratraldehyde, and 600 cc. of isopropanol was heated on a steam-bath to solution. On cooling the reaction mixture, 1-isonicotinyl-2-veratrylidenehydrazine precipitated. It was recovered by filtration and crystallized from isopropanol; M.P. 189–190° C.

This application is a division of my copending application Serial No. 275,250, filed March 7, 1952, now abandoned.

I claim:
1-isonicotinyl-2-veratrylidenehydrazine.

References Cited in the file of this patent

Meyer et al.: Monatshefte fur Chemie, vol. 33 (1912), pp. 393–414.

Selikoff et al.: Quart. Bull. of Sea View Hospital, vol. XIII, No. 1 (Jan. 1952), pp. 17–26.

Shchukina et al.: Chem. Abst. vol. 46 (1952), pp. 10431–10432.